US012503335B2

United States Patent
(12) United States Patent
Hsu

(10) Patent No.: US 12,503,335 B2
(45) Date of Patent: Dec. 23, 2025

(54) CONTROL FOR SHUTTLE ELEVATOR GROUPS

(71) Applicant: Otis Elevator Company

(72) Inventor: Arthur Hsu, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1405 days.

(21) Appl. No.: 17/126,258

(22) Filed: Dec. 18, 2020

(65) Prior Publication Data

US 2021/0188594 A1 Jun. 24, 2021

Related U.S. Application Data

(60) Provisional application No. 62/951,510, filed on Dec. 20, 2019.

(51) Int. Cl.

| | |
|---|---|
| ***B66B 1/28*** | (2006.01) |
| ***B66B 1/24*** | (2006.01) |
| ***B66B 1/34*** | (2006.01) |
| ***B66B 5/00*** | (2006.01) |

(52) U.S. Cl.

CPC .............. *B66B 1/28* (2013.01); *B66B 1/2458* (2013.01); *B66B 1/3407* (2013.01); *B66B 5/0012* (2013.01); *B66B 2201/303* (2013.01)

(58) Field of Classification Search

CPC ....... B66B 1/28; B66B 1/2458; B66B 1/3407; B66B 5/0012; B66B 2201/303; B66B 2201/215; B66B 2201/226; B66B 2201/222

See application file for complete search history.

(56) References Cited

U.S. PATENT DOCUMENTS

| | | | | |
|---|---|---|---|---|
| 4,838,385 | A * | 6/1989 | Ekholm | B66B 1/2458 187/247 |
| 5,447,212 | A * | 9/1995 | Powell | B66B 1/2458 187/382 |
| 6,237,721 | B1 * | 5/2001 | Siikonen | B66B 1/2458 187/382 |
| 2018/0093856 | A1 * | 4/2018 | Hughes | B66B 1/28 |
| 2019/0337757 | A1 * | 11/2019 | Auvinen | B66B 1/468 |
| 2020/0130994 | A1 * | 4/2020 | Tatikola | B66B 1/3476 |
| 2020/0377330 | A1 * | 12/2020 | Sudi | G06V 40/103 |

FOREIGN PATENT DOCUMENTS

CN 1208389 A 2/1999

OTHER PUBLICATIONS

Chinese Office Action for Application No. 202011501164.4; Issued Aug. 1, 2022; 11 Pages.

* cited by examiner

*Primary Examiner* — Jeffrey Donels

(74) *Attorney, Agent, or Firm* — CANTOR COLBURN LLP

(57) ABSTRACT

A method of operating a shuttle elevator group including: detecting an arrival of an elevator car at a landing; determining a time since a previous elevator car departed the landing; determining a fullness percentage of the elevator car; determining an estimated time until a next elevator car arrives at the landing; and determining when the elevator car departs the landing based upon at least one of the fullness percentage of the elevator car, the time since the previous elevator car departed the landing, and the estimated time until the next elevator car arrives at the landing.

20 Claims, 8 Drawing Sheets

CONTROL FOR SHUTTLE ELEVATOR GROUPS

CROSS-REFERENCE TO RELATED APPLICATIONS

This application claims the benefit of U.S. provisional patent application Ser. No. 62/951,510, filed Dec. 20, 2019, the entire contents of which are incorporated herein by reference.

BACKGROUND

The subject matter disclosed herein relates generally to the field of elevator systems, and specifically to a method and apparatus for operating a shuttle elevator group.

Shuttle elevator groups may consist of one or more elevator systems that are used to shuttle people between a lobby (e.g., ground floor) and a sky lobby (e.g., observation deck).

BRIEF SUMMARY

According to an embodiment, a method of operating a shuttle elevator group is provided. The method including: detecting an arrival of an elevator car at a landing; determining a time since a previous elevator car departed the landing; determining a fullness percentage of the elevator car; determining an estimated time until a next elevator car arrives at the landing; and determining when the elevator car departs the landing based upon at least one of the fullness percentage of the elevator car, the time since the previous elevator car departed the landing, and the estimated time until the next elevator car arrives at the landing.

In addition to one or more of the features described herein, or as an alternative, further embodiments may include: detecting a number of passengers within the elevator car, wherein the fullness percentage of the elevator car is determined in response to the number of passengers within the elevator car.

In addition to one or more of the features described herein, or as an alternative, further embodiments may include: commanding the elevator car to the depart the landing when the fullness percentage of the elevator car is greater than a selected fullness percentage.

In addition to one or more of the features described herein, or as an alternative, further embodiments may include: commanding the elevator car to the depart the landing when the time since the previous elevator car departed the landing is greater than a selected period of time.

In addition to one or more of the features described herein, or as an alternative, further embodiments may include: commanding the elevator car to the depart the landing when the estimated time until the next elevator car arrives at the landing is less than a selected period of time.

In addition to one or more of the features described herein, or as an alternative, further embodiments may include: commanding the elevator car to the depart the landing when the fullness percentage of the elevator car is greater than a selected fullness percentage; commanding the elevator car to the depart the landing when the time since the previous elevator car departed the landing is greater than a selected period of time; and commanding the elevator car to the depart the landing when the estimated time until the next elevator car arrives at the landing is less than a selected period of time.

In addition to one or more of the features described herein, or as an alternative, further embodiments may include: obtaining a layout of a physical location of two or more elevator systems within an elevator lobby at the landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

According to another embodiment, a method of operating a shuttle elevator group is provided. The method including: obtaining a layout of a physical location of two or more elevator systems within an elevator lobby at a landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

In addition to one or more of the features described herein, or as an alternative, further embodiments may include: coordinating arrival of the elevator car of each of the two or more elevator systems such that elevator car arrives from each of the two or more elevator systems in a clockwise order around the arrangement.

In addition to one or more of the features described herein, or as an alternative, further embodiments may include: coordinating arrival of the elevator car of each of the two or more elevator systems such that elevator car arrives from each of the two or more elevator systems in a counter clockwise order around the arrangement.

In addition to one or more of the features described herein, or as an alternative, further embodiments may include: organizing the two or more elevator systems into a first group and a second group within the elevator lobby.

In addition to one or more of the features described herein, or as an alternative, further embodiments may include: deactivating the first group, such that the two or more elevator system organized in the first group are no longer called to the landing.

In addition to one or more of the features described herein, or as an alternative, further embodiments may that the first group is located on first side of the elevator lobby and the second group is located on second side of the elevator lobby.

According to another embodiment, a computer program product embodied on a non-transitory computer readable medium is provided. The computer program product including instructions that, when executed by a processor, cause the processor to perform operations including: detecting an arrival of an elevator car at a landing; determining a time since a previous elevator car departed the landing; determining a fullness percentage of the elevator car in response to the number of passengers within the elevator car; determining an estimated time until a next elevator car arrives at the landing; and determining when the elevator car departs the landing based upon at least one of the fullness percentage of the elevator car, the time since the previous elevator car departed the landing, and the estimated time until the next elevator car arrives at the landing.

In addition to one or more of the features described herein, or as an alternative, further embodiments may include that the operations further include: detecting a number of passengers within the elevator car, wherein the fullness percentage of the elevator car is determined in response to the number of passengers within the elevator car In addition to one or more of the features described herein, or as an alternative, further embodiments may include that the operations further include: commanding the elevator car to the depart the landing when the fullness percentage of the elevator car is greater than a selected fullness percentage.

In addition to one or more of the features described herein, or as an alternative, further embodiments may include that the operations further include: commanding the elevator car to the depart the landing when the time since the previous elevator car departed the landing is greater than a selected period of time.

In addition to one or more of the features described herein, or as an alternative, further embodiments may include that the operations further include: commanding the elevator car to the depart the landing when the estimated time until the next elevator car arrives at the landing is less than a selected period of time.

In addition to one or more of the features described herein, or as an alternative, further embodiments may include that the operations further include: commanding the elevator car to the depart the landing when the fullness percentage of the elevator car is greater than a selected fullness percentage; commanding the elevator car to the depart the landing when the time since the previous elevator car departed the landing is greater than a selected period of time; and commanding the elevator car to the depart the landing when the estimated time until the next elevator car arrives at the landing is less than a selected period of time.

In addition to one or more of the features described herein, or as an alternative, further embodiments may include that the operations further include: obtaining a layout of a physical location of two or more elevator systems within an elevator lobby at the landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

Technical effects of embodiments of the present disclosure include operating a shuttle elevator group to alleviate bunching by monitoring both a fullness percentage of elevator cars and a time spend at a landing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
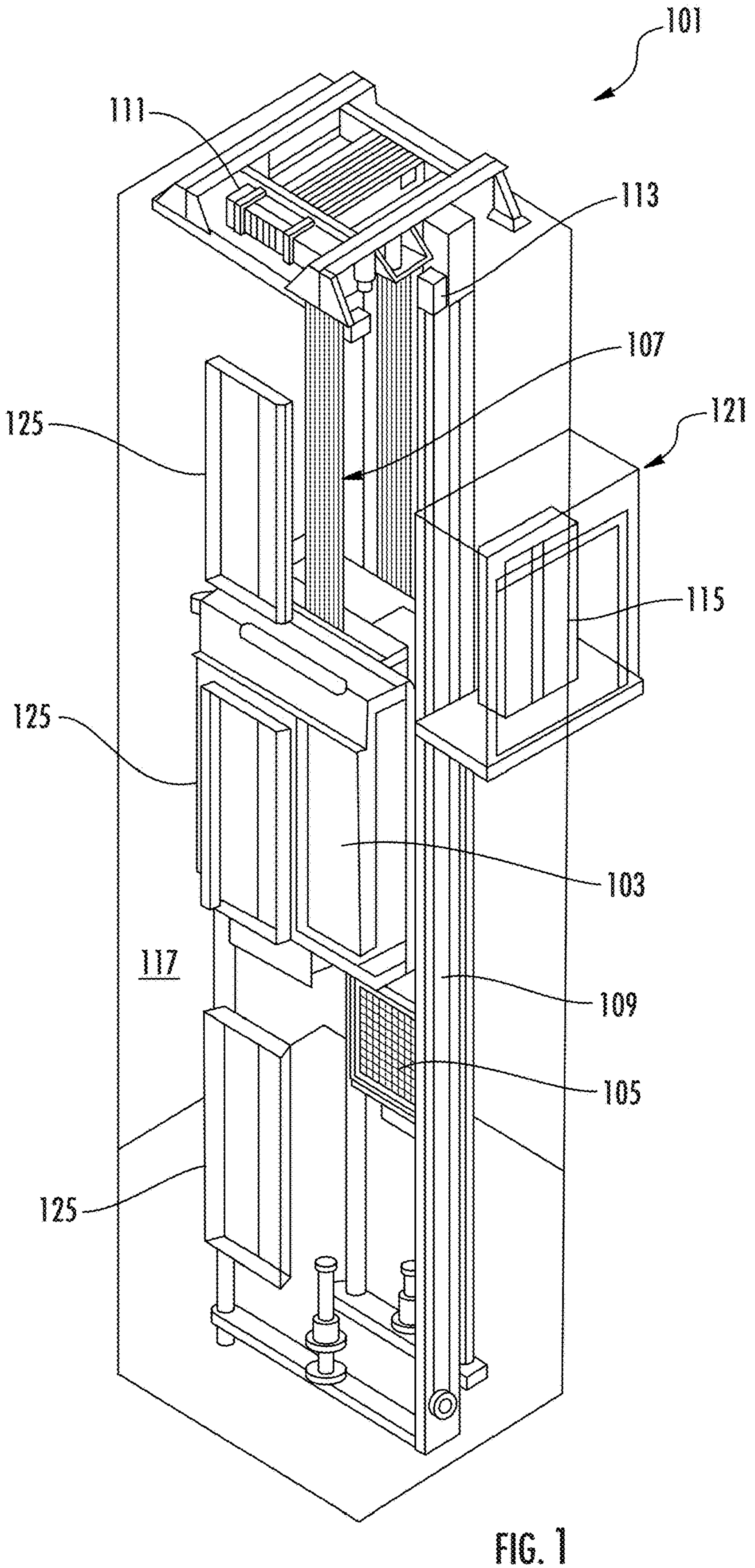
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figure 2:
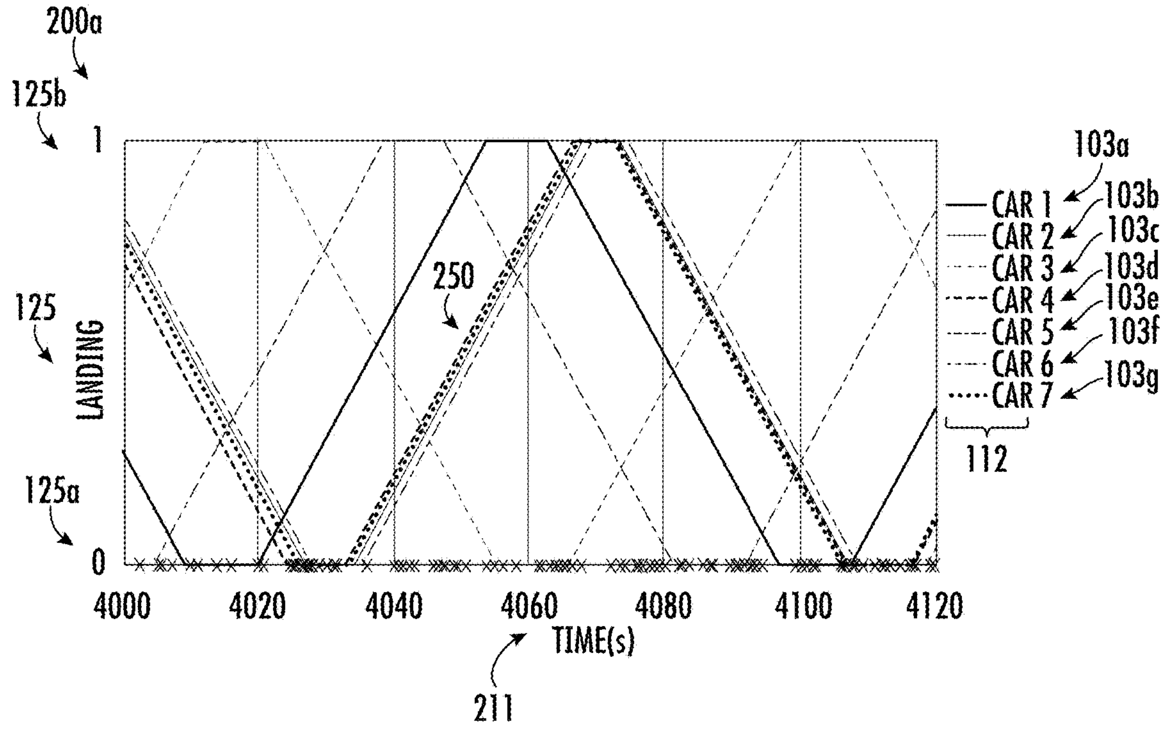
FIG. 2 illustrates a time versus landing operation chart of a shuttle elevator group demonstrating bunching, in accordance with an embodiment of the disclosure.
Figure 3:
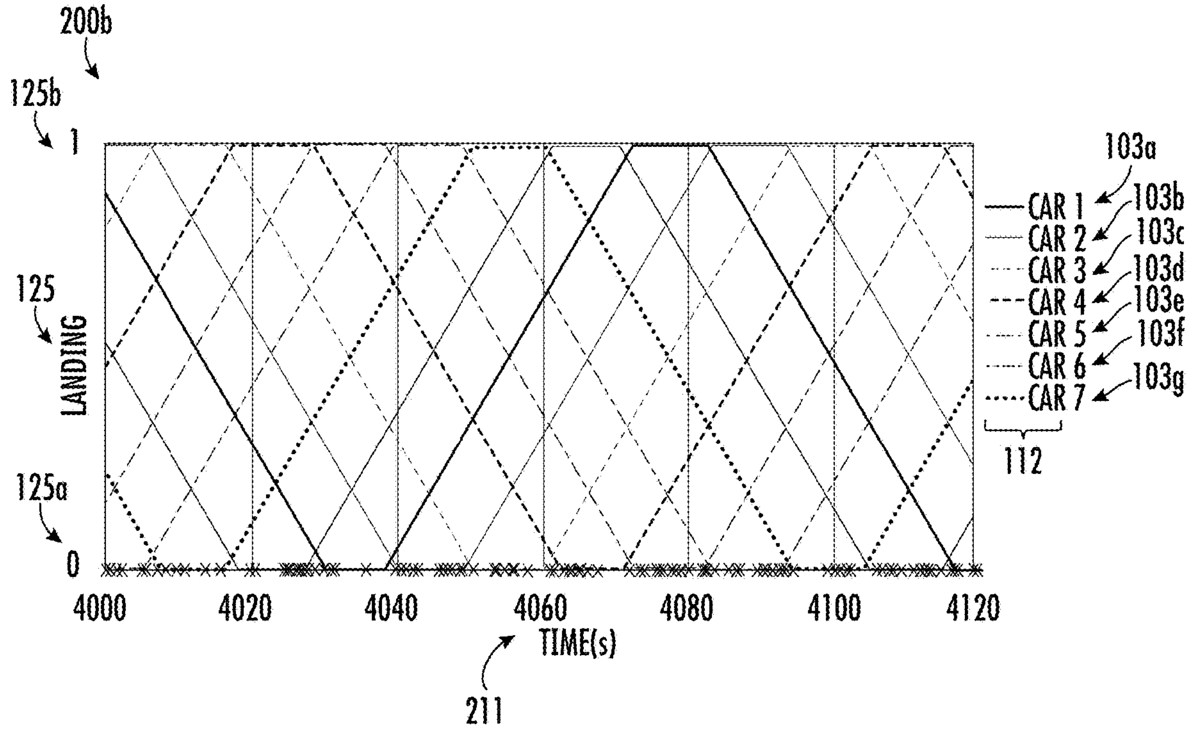
FIG. 3 illustrates a time versus landing operation chart of a shuttle elevator group not demonstrating bunching, in accordance with an embodiment of the disclosure.

Referring now to FIGS. 2 and 3 with continued reference to FIG. 1, which both illustrate a time 211 versus landing 125 operation chart 200*a*, 200*b* of a shuttle elevator group 112 that comprises a plurality of elevator cars 103*a*-103*g*. Each of the plurality of elevator cars 103*a*-103*g* shuttle people (i.e., passengers) between a primary landing 125*a* and a secondary landing 125*b*. The primary landing 125*a* may be a ground floor or sky lobby where passengers may board one of the plurality of elevator cars 103*a*-103*g* to be transported to the secondary landing 125*b*. The secondary landing 125*b* may be an sky lobby where passengers transfer to another elevator car 103 or the secondary landing 125 may be an observation deck. The plurality of elevator cars 103*a*-103*g* comprises a first elevator car 103*a*, a second elevator car 103*b*, a third elevator car 103*c*, a fourth elevator car 103*d*, a fifth elevator car 103*e*, a sixth elevator car 103*f*, and a seventh elevator car 103*g*. It is understood while the plurality of elevator cars 103*a*-103*g* disclosed in FIGS. 2 and 3 comprise seven elevator cars 103, the embodiments disclosed herein may be applicable to any shuttle elevator group comprising two or more elevator cars 103.

Currently, the same dispatching algorithm is typically used in all types of shuttle elevator groups, whether the shuttle elevator group is a standard "local service" elevator group (e.g., serving many landings 125) or a shuttle elevator group 112 serving two landings 125, as illustrated in FIGS. 2 and 3. FIG. 2 illustrates a problem unique to the shuttle elevator group 112, which is referred to as bunching. Bunching occurs when elevator cars 103 "bunch up" and begin travelling close together in time in bunches 250. There may be a multitude of reasons for bunching, one reason may include that one elevator car is waiting too long at a landing 125 to fill up with passengers, which may then back up the next elevators cars. Once bunches 250 begin to form they tend to propagate forward in time. The bunch 250 illustrated in FIG. 2 is composed of the fifth elevator car 103*e*, the fourth elevator car 103*d*, the second elevator car 103*b*, the seventh elevator car 103*g*, and the sixth elevator car 103*f*.

Bunching may lead to several elevator cars 103 arriving very close together or nearly at the same time to landings 125, which may result in long wait times for passengers who arrive to board an elevator car just after the bunch 250 departs. Advantageously, there is a significant opportunity to improve performance of a shuttle elevator group 112 and prevent bunching by exploiting the predictable pattern of landings 125 served and applying an optimal control method, such as, for example, an optimal stopping rule, as described herein. The embodiments disclosed herein seek to reduce the average wait time for an elevator car 103 in a shuttle elevator group 112 by dynamically controlling the "spacing" between the arrival of consecutive elevator cars 103 at the primary landing 125*a* (or secondary landing 125*b*) to generate uniform time spacing between the arrival of consecutive elevator cars 103, as illustrated in FIG. 3. This may reduce average wait time by well over 50% by reducing and/or eliminating "bunching". Additionally, this may also reduce the time to departure and time to destination.

Figure 4:
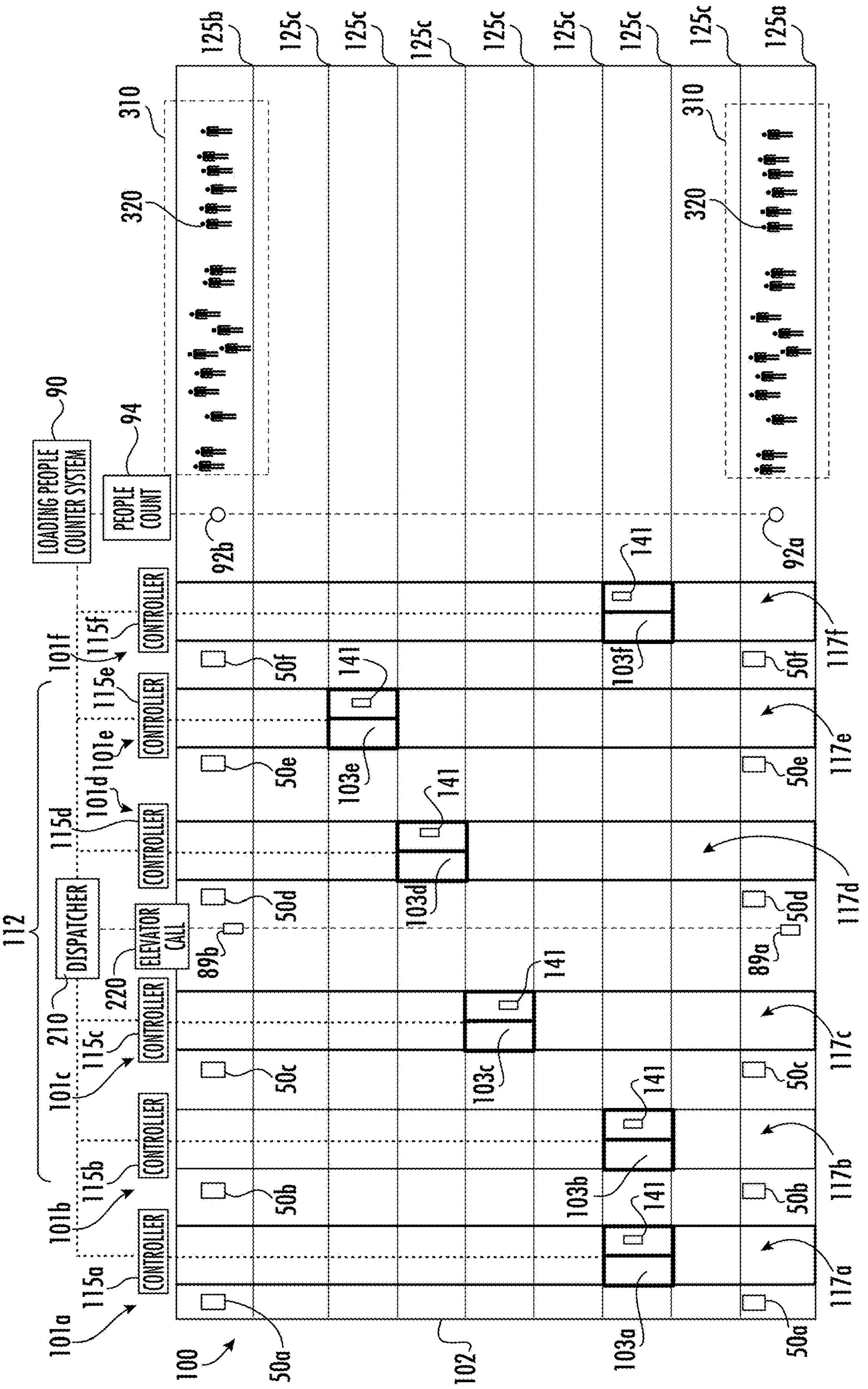
FIG. 4 illustrates a schematic view of a building elevator system for use with the elevator system of FIG. 1, in accordance with an embodiment of the disclosure.

Referring now to FIG. 4 with continued reference to FIGS. 1-3. The seventh elevator car 103*g* has been removed to simplify the illustration in FIG. 4. As seen in FIG. 2, a building elevator system 100 within a building 102 may include multiple different individual elevator systems 101*a*-101*f* organized in a shuttle elevator group 112 (e.g., elevator banks). The elevator systems 101*a*-101*f* include a first elevator system 101*a* having an elevator car 103*a*, a second elevator system 101*b* having an elevator car 103*b*, a third elevator system 101*c* having an elevator car 103*c*, a fourth elevator system 101*d* having an elevator car 103*d*, a fifth elevator system 101*e* having an elevator car 103*e*, and a sixth elevator system 101*f* having an elevator car 103*f*. It is understood that while six elevator systems 101*a*-101*f* are utilized for exemplary illustration, embodiments disclosed herein may be applied to building elevator systems 100 having two or more elevator systems 101. It is also understood that while nine landings 125 are utilized for exemplary illustration, embodiments disclosed herein may be applied to building elevator systems 100 having any number of landings 125. FIG. 4 illustrates the primary landing 125*a*, the secondary landing 125*b* and all of the intermediate landings 125*c* between the primary landing 125*a* and the secondary landing 125*b*. Elevator cars 103*a*-103*f* of the shuttle elevator group 112 typically do not stop at the intermediate landings 125*c* but rather ferry passenger between the primary landing 125*a* and the secondary landing 125*b*. It is understood that while the primary landing 125*a* and the secondary landing 125*b* are utilized, the embodiments disclosed herein may also be applicable to elevator system 101 stopping at landings 125*c* between the primary landing 125*a* and the secondary landing 125*b*.

Further, the elevator systems 101*a*-101*f* illustrated in FIG. 4 are organized into a single shuttle elevator group 112 for ease of explanation but it is understood that the elevator systems 101*a*-101*f* may be organized into one or more shuttle elevator groups. The shuttle elevator group 112 may contain one or more elevator systems 101.

The primary landing 125*a* and the secondary landing 125*b* in the building 102 of FIG. 4 may have an elevator call device 89*a*, 89*b*. The elevator call device 89*a*, 89*b* sends an elevator call 220 to the dispatcher 210 including the source of the elevator call 220. The elevator call device 89*a*, 89*b* may include a destination entry option that includes the destination of the elevator call 220. The elevator call device 89*a*, 89*b* may be a push button and/or a touch screen and may be activated manually or automatically. For example, the elevator call 220 may be sent by an individual entering the elevator call 220 via the elevator call device 89*a*, 89*b*. The elevator call device 89*a*, 89*b* may also be activated to send an elevator call 220 by voice recognition or a passenger detection mechanism in the hallway, such as, for example a weight sensing device, a visual recognition device, depth sensing device, radar device, a laser detection device, and/or any other desired device capable of sensing the presence of a passenger. The elevator call device 89*a*, 89*b* may be activated to send an elevator call 220 through an automatic elevator call system that automatically initiates an elevator call 220 when an individual is determined to be moving towards the elevator system in order to call an elevator or when an individual is scheduled to activate the elevator call device 89*a*, 89*b*. The elevator call device 89*a*, 89*b* may also be a mobile device configured to transmit an elevator call 220. The mobile device may be a smart phone, smart watch, laptop, or any other mobile device known to one of skill in the art. It is understood that embodiments disclosed herein may be applicable to elevator systems 101*a*-101*f* that do not utilize an elevator call device 89*a*, 89*b*, and therefore the dispatcher 210 may dispatch an elevator car 103*a*-103*f* based upon a schedule rather than an elevator call 220 or the presence of people 320 in an elevator lobby 310, as detected by a landing people counter device 92*a*, 92*b*.

The controllers 115*a*-115*f* can be combined, local, remote, cloud, etc. The dispatcher 210 may be local, remote, cloud, etc. The dispatcher 210 is in communication with the controller 115*a*-115*f* of each elevator system 101*a*-101*f*. Alternatively, there may be a controller 115 that is common to all of the elevator systems 101*a*-101*f* and controls all of the elevator system 101*a*-101*f*. The dispatcher 210 may be a 'group' software that is configured to select the best elevator car 103 assigned to the elevator call 220. The dispatcher 210 manages the elevator call devices 89*a*, 89*b* related to the shuttle elevator group 112.

The dispatcher 210 is configured to control and coordinate operation of multiple elevator systems 101*a*-101*f*. The dispatcher 210 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The dispatcher 210 is in communication with each of the elevator call devices 89*a*, 89*b* of the building elevator system 100. The dispatcher 210 is configured to receive each elevator call 220 transmitted from the elevator call devices 89*a*, 89*b*. The dispatcher 210 is configured to manage the elevators calls 220 coming in from each elevator call device 89*a*, 89*b* and command one or more elevator systems 101*a*-101*f* to respond to elevator calls 220. Alternatively, in the event no elevator call devices 89*a*, 89*b* are present, the dispatcher 210 is configured to dispatch elevator cars 103*a*-103*f* based upon a schedule, how long the elevator car 103*a*-103*f* has been at a landing, and/or detection of people 320 within the elevator lobby 310 rather than an elevator call 220.

Each elevator system 101*a*-101*f* may include an elevator car people counter 141 configured to detect a number passengers (i.e., people) within the elevator car 103*a*-103*f*. The elevator car people counter 141 is in communication with the dispatcher 210 and/or the controller 115*a*-115*f*. The number of passengers allows the dispatcher 210 to determine how much space is left in the elevator car 103*a*-103*f*. The elevator car people counters 141 may use a variety of sensing mechanisms, such as, for example, a visual detection device, a weight detection device, a laser detection device, a door reversal monitoring device, a thermal image detection device, and a depth detection device. The visual detection device may be a camera that utilizes visual recognition to identify individual passengers and objects in the elevator car 103*a*-103*f*. The weight detection device may be a scale to sense the amount of weight in an elevator car 103*a*-103*f* and then determine the number of passengers. The laser detection device may detect how many passengers walk through a laser beam to determine the number of passengers in the elevator car 103*a*-103*f*. Similarly, a door reversal monitoring device also detects passengers entering the car so as not to close the elevator door on a passenger and thus may be used to determine the number of passengers. The thermal detection device may be an infrared or other heat sensing camera that utilizes detected temperature to identify individual passengers and objects in the elevator car 103*a*-103*f* and then determine the number of passengers. The depth detection device may be a 2-D, 3-D or other depth/distance detecting camera that utilizes detected distance to an object and/or passenger to determine the number of passengers. As may be appreciated by one of skill in the art, in addition to the stated methods, additional methods may exist to sense the number of passengers and one or any combination of these methods may be used to determine the number of passengers in the elevator car 103*a*-103*f*. The elevator car people counters 141 may also be able to detect luggage or other objects that may take up space in the elevator car 103*a*-103*f* and differentiate such objects from people.

Advantageously, in order to avoid the bunching 250 illustrated in FIG. 2, the dispatcher 210 is configured to dispatch elevator cars 103*a*-103*f* based upon at least one of a fullness percentage of an elevator car 103*a*-103*f* based on the number of passenger detected, how much time since a departure of a previous elevator car 103 departure from the landing 125, and how much time until the next elevator car 103 arrives at the landing 125.

The landing people counter system 90 is configured to detect or determine a people count 94. The people count 94 may be a number of people 320 located on a landing 125*a*,

**125*b* or more specifically a number of people 320 located in an elevator lobby 310 on a landing 125*a*, 125*b*. The people count 94 may be an exact number of people 320 or an approximate number of people 320. The primary landing 125*a* and the secondary landing 125*b* in the building 102 of FIG. 2 may include a landing people counter device 92*a*, 92*b*. The landing people counter device 92*a*, 92*b* may be located proximate the elevator group 112 on the primary landing 125*a* and the secondary landing 125*b*. The landing people counter device 92*a*, 92*b* may include a camera. The landing people counter device 92*a*, 92*b* is may be used to determine the people count 94 proximate the elevator systems 101 and/or within an elevator lobby 310 proximate the elevator systems 101. The elevator lobby 310 may be located on the primary landing 125*a* or the secondary landing 125*b*. The people count 94 may include number of people 320 located in the elevator lobby 310. People 320 being located proximate the elevator system 101 and/or within the elevator lobby 310 is indicative that the people 320 would like to board an elevator car 103 of the elevator system 101 to evacuate the building 102**.

The landing people counter device **92*a*, 92*b* may include one or more detection mechanisms in the elevator lobby 310, such as, for example a weight sensing device, a visual recognition device, depth sensing device, radar device, a laser detection device, mobile device (e.g., cell phone) tracking, and/or any other desired device capable of sensing the presence of people 320. The visual recognition device may be a camera that utilizes visual recognition to identify individual people 320 and objects in elevator lobby 310. The weight detection device may be a scale to sense the amount of weight in an elevator lobby 310 and then determine the number of people 320. The laser detection device may detect how many passengers walk through a laser beam to determine the number of people 310 in the elevator lobby 310. The thermal detection device may be an infrared or other heat sensing camera that utilizes detected temperature to identify individual people 320 and objects in the elevator lobby 310 and then determine the number of people 320. The depth detection device may be a 2-D, 3-D or other depth/distance detecting camera that utilizes detected distance to an object and/or people 320 to determine the number of passengers. The mobile device tracking may determine a number of people on a landing 125 or an in elevator lobby 310 by tracking mobile device wireless signals and/or detecting how many mobile devices are utilizing a specific application on the mobile device within the building 102 on the landing 125 or in the elevator lobby 310. As may be appreciated by one of skill in the art, in addition to the stated methods, additional methods may exist to sense the number of people 320 and one or any combination of these methods may be used to determine the number of people 320 in the elevator lobby 310 or on the landing 125**.

In one embodiment, the landing people counter device **92*a*, 92*b* is able to detect the people count 94 through image pixel counting. The people count 94 may compare a current image of the elevator lobby 310 to a stock image of the elevator lobby 310. For example, the landing people counter device 92*a*, 92*b* may utilize pixel counting by capturing a current image of the elevator lobby 310 and comparing the current image of the elevator lobby 310 to a stock image of the elevator lobby 310 that illustrates the elevator lobby 310 with zero people 320 present or a known number of people 320 present. The number of pixels that are different between the stock image of the elevator lobby 310 and the current image of the elevator lobby 310 may correlate with the people count 94 within the elevator lobby 310. It is understood that the embodiments disclosed herein are not limited to pixel counting to determine a people count 94 and thus a people count 94 may be determined utilizing other method including but not limited to video analytics software. Video analytics may identify people 300 from stationary objections and count each person separately to determine a total number of people 300**.

The people count 94 may be determined using a machine learning, deep learning, and/or artificial intelligence module. The artificial intelligence module can be located in the landing people counter device **92*a*, 92*b* or in a separate module in the elevator lobby 310 or on the landing 125. The separate module may be able to communicate with the landing people counter device 92*a*, 92*b*. The people count 94 may alternatively be expressed as a percentage from zero-to-one-hundred percent indicating what percentage of pixels are different between the stock image of the elevator lobby 310 and the current image of the elevator lobby 310. The people count 94 of the elevator lobby 310 may be expressed as a scale of one-to-ten (e.g., one being empty and ten being full) indicating what percentage of pixels are different between the stock image of the elevator lobby 310 and the current image of the elevator lobby 310. The people count 94 may be expressed as an actual or estimated number of people 320, which may be determined in response to the number of pixels that are different between the stock image of the elevator lobby 310 and the current image of the elevator lobby 310**.

Advantageously, the landing people counter system 90 may be used to replace the elevator call devices **89*a*, 89*b*. Thus, an elevator call 220 may be transmitted to the dispatcher when the people count 94** is equal to or greater than a selected people count.

Additionally, a display device **50*a*-50*f* may be located on the primary landing 125*a* and the secondary landing 125*b* proximate each elevator system 101*a*-101*f*. As illustrated in FIG. 4, each elevator system 101*a*-101*f* may have its own display device 50*a*-50*f* on each of the primary landing 125*a* and the secondary landing 125*b*. Alternatively there may be a single displace device 50 for the primary landing 125*a* and a single display device for the secondary landing 125*b* (see FIG. 10). The display device 50*a*-50*f* visually displays if an elevator car 103 will be arriving for the elevator system 101*a*-101*f* associated with the display device 50*a*-50*f*. Advantageously, this will allow people 320 to know which elevator system 101*a*-101*f* has an elevator car 103*a*-103*f* arriving next at the landing 125*a*, 125*b*. Advantageously, the display devices 50 will allow people 320 waiting in the elevator lobby 310 to know which elevator cars 103*a*-103*f* will arrive soon and thus the people 320 can crowd around the correct elevator system 101*a*-101*f***, thus reducing elevator boarding times.

Figure 5:
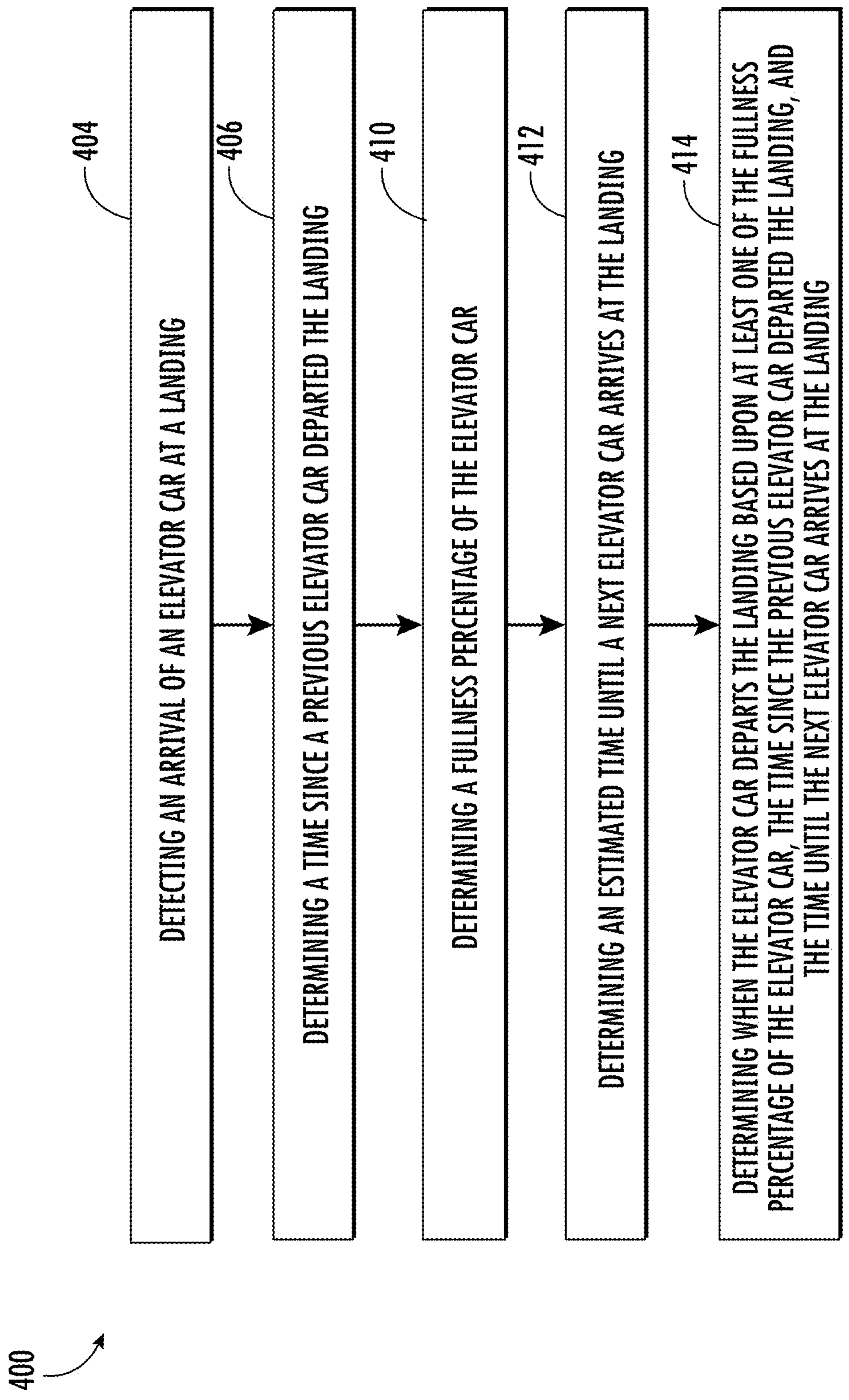
FIG. 5 is a flow chart of method operating a shuttle elevator group, in accordance with an embodiment of the disclosure.
Figure 6:
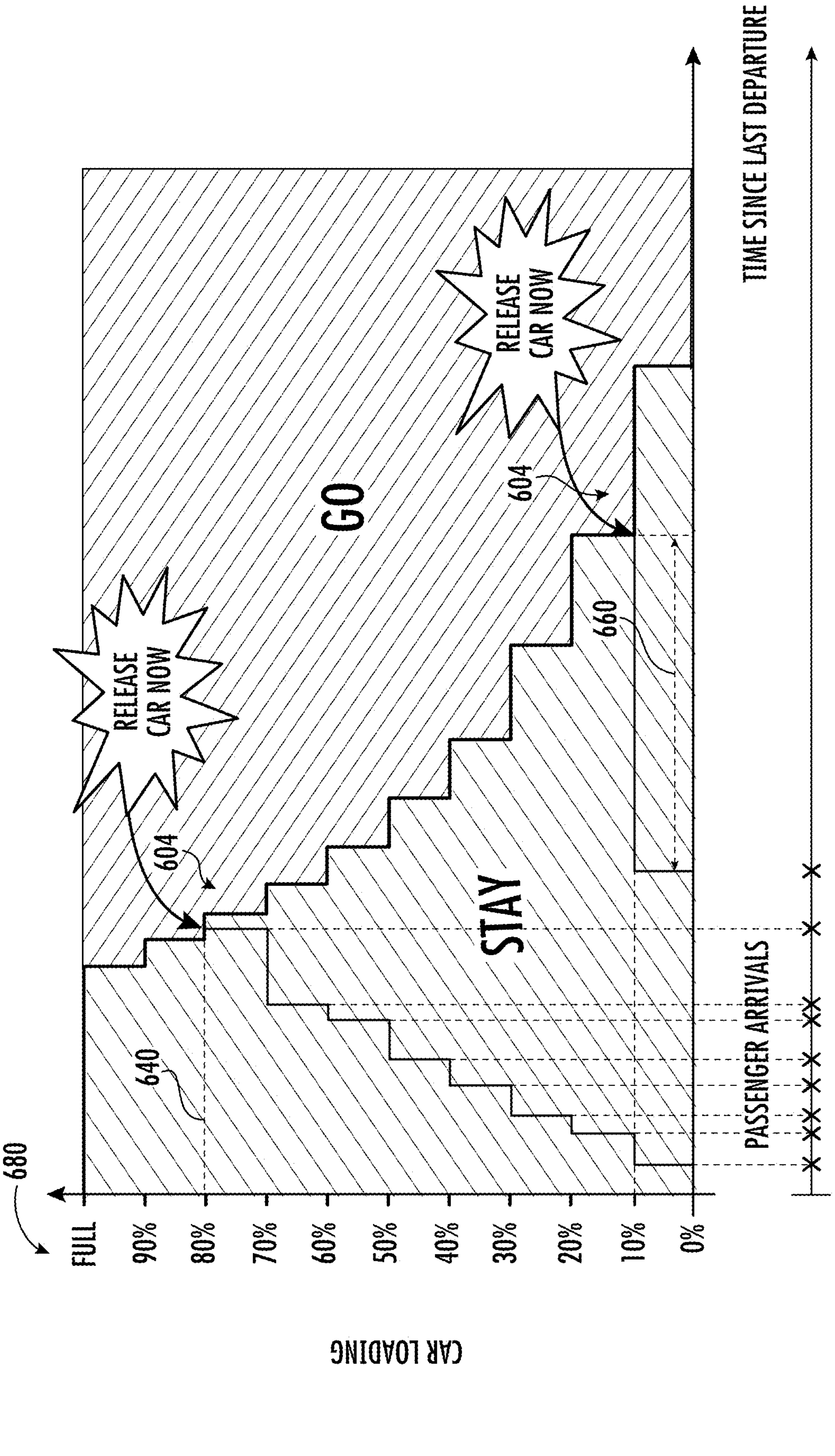
FIG. 6 illustrates different scenarios 602, 604 that may prompt the release of an elevator car from the landing, in accordance with an embodiment of the disclosure.

Referring now to FIGS. 5 and 6, while referencing components of FIGS. 1-4. FIG. 5 shows a flow chart of method 400 of operating a shuttle elevator group 112, in accordance with an embodiment of the disclosure. In an embodiment, the method 400 may be performed by the dispatcher 210 of FIG. 2. At block 404, an arrival of an elevator car 103 at a landing 125 is detected. At block 406, a time since a previous elevator car 103 departed the landing 125 is determined. At block 410, a fullness percentage 680 of the elevator car 103 is determined. The fullness percentage 680 determination may be based on a detected number of passengers (i.e., people 320) within the elevator car 103 or upon any other analog thereof, such as, for example, detecting occupied space in the car, weight in the car, or any other similar method known to one of skill in the art. At block 412, an estimated time until a next elevator car 103 arrives at the landing 125 is determined. At block 414, it is determined when the elevator car 103 departs the landing 125 based upon at least one of the fullness percentage 680 of the elevator car 103, the time since the previous elevator car 103 departed the landing 125, and the estimated time until the next elevator car 103 arrives at the landing 125.

FIG. 6 illustrates different scenarios 602, 604 that may prompt the release of an elevator car 103 from the landing 125. As illustrated in FIG. 6 at scenario 602, the elevator car 103 may be commanded to depart the landing 125 when a number of passengers 320 enter the elevator car 103 and the fullness percentage 680 of the elevator car 103 is greater than a selected fullness percentage 640. Therefore, the method 400 may also comprise: commanding the elevator car 103 to depart the landing 125 when the fullness percentage 680 of the elevator car 103 is greater than a selected fullness percentage 640. For example, the selected fullness percentage 640 may be 80%, as shown in FIG. 6. It is understood that the selected fullness percentage 40 may be greater than or less than 80% as well. As illustrated in FIG. 6 at scenario 604, the elevator car 103 may be commanded to depart the landing 125 when the time since the previous elevator car 103 departed the landing 125 is greater than a selected period of time 660. For example, the selected period of time 60 may be 30 seconds. It is understood that the selected period of time 60 may be greater than or less than 30 seconds. The method 400 may further comprise: commanding the elevator car 103 to the depart the landing 125 when the time since the previous elevator car 103 departed the landing 125 is greater than a selected period of time 660. Additionally, the method 400 may yet further comprise: commanding the elevator car 103 to depart the landing 125 when the estimated time until the next elevator car 103 arrives at the landing 125 is less than a selected period of time. For example, this selected period of time may be equal to one minute. It is understood that the selected period of time 60 may be greater than or less than one minute.

While the above description has described the flow process of FIG. 5 in a particular order, it should be appreciated that unless otherwise specifically required in the attached claims that the ordering of the steps may be varied.

Figure 7:
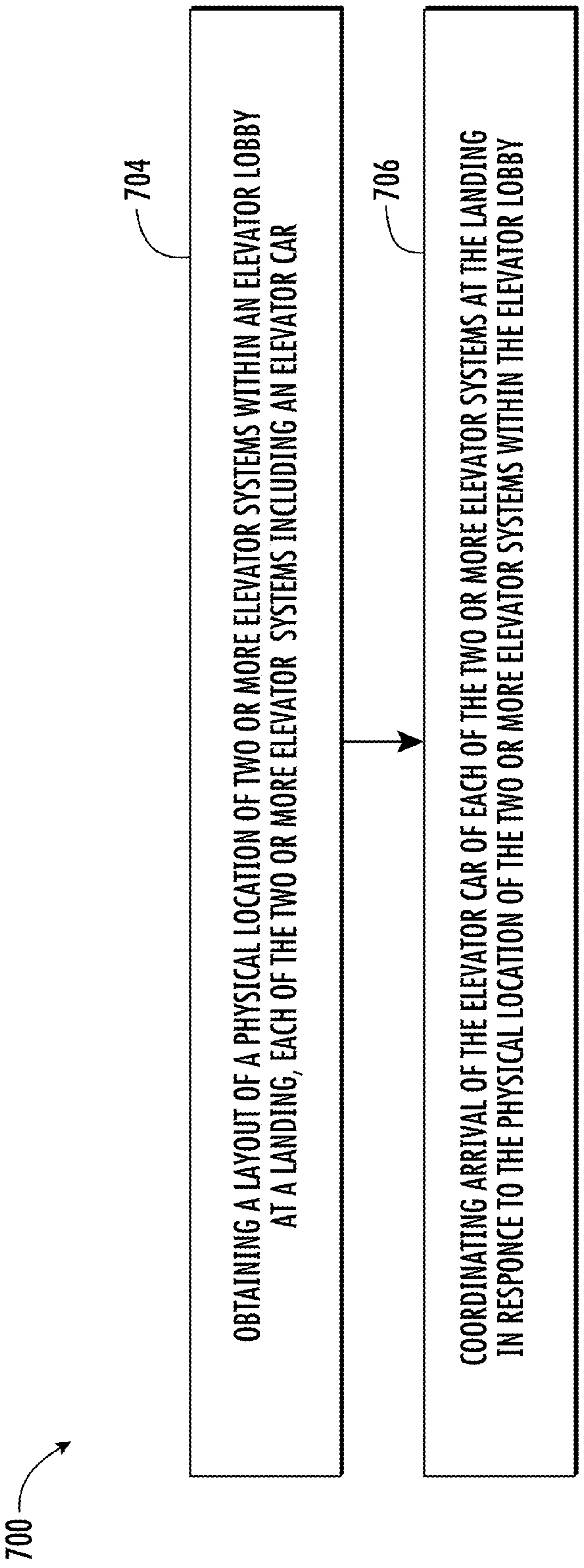
FIG. 7 is a flow chart of method operating a shuttle elevator group, in accordance with an embodiment of the disclosure.
Figure 9:
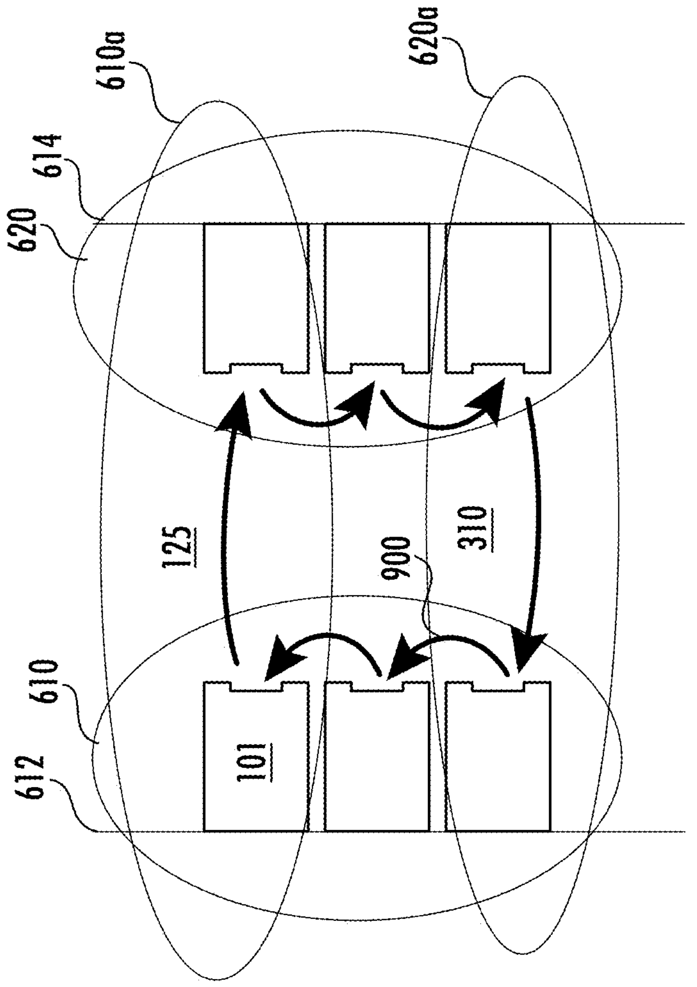
FIG. 9 illustrates an coordinated system where the arrival from the elevator car of multiple elevator systems at the landing is coordinated, in accordance with an embodiment of the disclosure.
Figure 8:
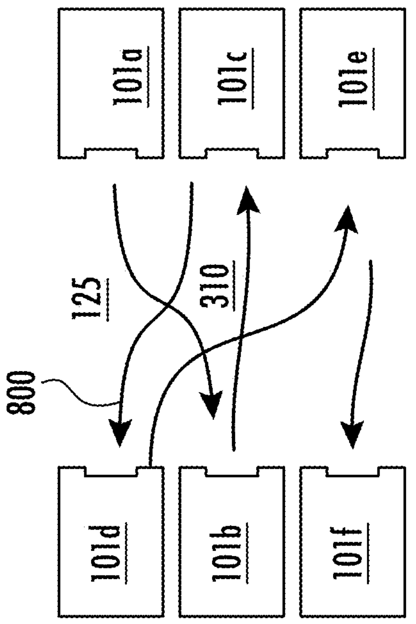
FIG. 8 illustrates an uncoordinated system where the arrival from the elevator car of multiple elevator systems at the landing is uncoordinated.

Referring now to FIGS. 7, 8, 9, and 10, while referencing components of FIGS. 1-4. FIG. 7 shows a flow chart of method 700 of operating a shuttle elevator group 112, in accordance with an embodiment of the disclosure. In an embodiment, the method 700 may be performed by the dispatcher 210 of FIG. 2. At block 704, a layout of a physical location of two or more elevator systems 101 within an elevator lobby 310 at a landing 125 is obtained. Each of the two or more elevator systems 101 include an elevator car 103. At block 706, the arrival of the elevator car 103 of each of the two or more elevator systems 101 at the landing 125 is coordinated in response to the physical location of the two or more elevator systems within the elevator lobby 310. The two or more elevator systems 101 are organized in an arrangement within the elevator lobby 310. In an embodiment, the two or more elevator systems 101 may be organized in a square arrangement, rectangular arrangement, triangular arrangement, circular arrangement, or any other arrangement within the elevator lobby 310. The arrangements illustrated in FIGS. 8 and 9 are rectangular. FIG. 8 illustrates an uncoordinated system where the arrival from the elevator car 103 of each of the two or more elevator systems 101 at the landing 125 is uncoordinated, which leaves a passenger guessing as to which elevator car 103 will arrive next. The arrows 800 in FIG. 8 indicate the order of arrivals of the elevator cars 103 of each elevator system 101. In the example illustrated in FIG. 8, the order of arrival of the elevator cars 103 from each elevator system 101 may be as follows: the first elevator system 101*a*, then the second elevator system 101*b*, then the third elevator system 101*c*, then the fourth elevator system 101*d*, then the fifth elevator system 101*e*, and then the sixth elevator system 101*f*. FIG. 9 illustrates a coordinated system where the arrival from the elevator car 103 of each of the two or more elevator systems 101 at the landing 125 is coordinated, which leaves a passenger confident knowing which elevator car 103 will arrive next. The arrows 900 in FIG. 9 indicate the order of arrivals of the elevator cars 103 of each elevator system 101.

Figure 10:
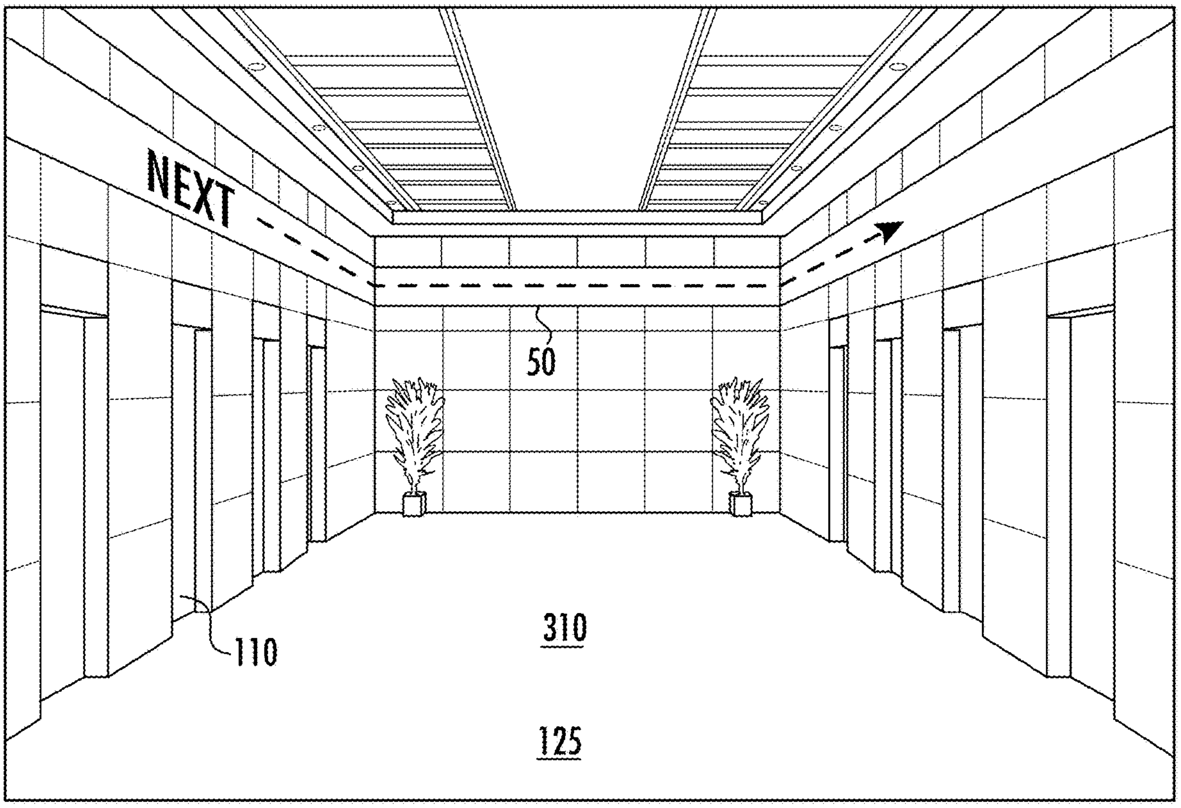
FIG. 10 illustrates a display device of a coordinated system where the arrival from the elevator car of multiple elevator systems at the landing is coordinated and the next elevator car is displayed on the display device, in accordance with an embodiment of the disclosure.

In an embodiment, the arrival of the elevator car 103 of each of the two or more elevator systems 101 may be coordinated such that elevator car 103 arrives from each of the two or more elevator systems 101 in a clockwise order around the arrangement, as illustrated in FIG. 9. The elevator lobby 310 may include one or more display devices 50 that display the direction that the elevator cars of the elevator systems 101 are coordinated to arrive. For example, as shown in FIG. 10, the arrival of the elevator car 103 of each of the two or more elevator systems 101 are coordinated such that elevator car 103 arrives from each of the two or more elevator systems 101 in a clockwise order, thus the display device 50 shows the clockwise direction of the elevator car 103 arrival. In another embodiment, the arrival of the elevator car 103 of each of the two or more elevator systems 101 may be coordinated such that elevator car 103 arrives from each of the two or more elevator systems 101 in a counter clockwise order around the arrangement.

In an embodiment, the two or more elevator systems 101 may be organized into a first group 610 and a second group 620 within the elevator lobby 310. The first group 610 may reside along a first wall 612 and the second group 620 may reside along a second wall 614 of the elevator lobby 310. The first group 610 or the second group 620 may be deactivated to simplify boarding for passengers, so they only have to look at one group. For example, the first group 610 may be deactivated, such that the two or more elevator system organized in the first group 610 are no longer called to the landing 125. For example, the first elevator group 610 may be deactivated during a low activity period.

Alternatively, the first group 610*a* and the second group 620*a* may be separated across the elevator lobby 310, as shown in FIG. 9 (i.e., the dividing line running through the lobby 310 from the first wall 612 to the second wall 614). The first group 610*a* or the second group 620*a* may be deactivated to simplify boarding for passengers. For example, the first group 610*a* may be deactivated, such that the two or more elevator system organized in the first group are no longer called to the landing.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a shuttle elevator group, the method comprising:

detecting an arrival of an elevator car at a landing;

determining a time since a previous elevator car departed the landing;

determining a fullness percentage of the elevator car;

determining an estimated time until a next elevator car arrives at the landing; and determining when the elevator car departs the landing based upon at least one of the fullness percentage of the elevator car, the time since the previous elevator car departed the landing, and the estimated time until the next elevator car arrives at the landing.

2. The method of claim 1, further comprising:

detecting a number of passengers within the elevator car, wherein the fullness percentage of the elevator car is determined in response to the number of passengers within the elevator car.

3. The method of claim 1, further comprising:

commanding the elevator car to the depart the landing when the fullness percentage of the elevator car is greater than a selected fullness percentage.

4. The method of claim 1, further comprising:

commanding the elevator car to the depart the landing when the time since the previous elevator car departed the landing is greater than a selected period of time.

5. The method of claim 1, further comprising:

commanding the elevator car to the depart the landing when the estimated time until the next elevator car arrives at the landing is less than a selected period of time.

6. The method of claim 1, further comprising:

commanding the elevator car to the depart the landing when the fullness percentage of the elevator car is greater than a selected fullness percentage;

commanding the elevator car to the depart the landing when the time since the previous elevator car departed the landing is greater than a selected period of time; and commanding the elevator car to the depart the landing when the estimated time until the next elevator car arrives at the landing is less than a selected period of time.

7. The method of claim 1, further comprising:

obtaining a layout of a physical location of two or more elevator systems within an elevator lobby at the landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

8. A method of operating a shuttle elevator group, the method comprising:

obtaining a layout of a physical location of two or more elevator systems within an elevator lobby at a landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

9. The method of claim 8, further comprising:

coordinating arrival of the elevator car of each of the two or more elevator systems such that elevator car arrives from each of the two or more elevator systems in a clockwise order around the arrangement.

10. The method of claim 8, further comprising:

coordinating arrival of the elevator car of each of the two or more elevator systems such that elevator car arrives from each of the two or more elevator systems in a counter clockwise order around the arrangement.

11. The method of claim 8, further comprising:

organizing the two or more elevator systems into a first group and a second group within the elevator lobby.

12. The method of claim 11, further comprising:

deactivating the first group, such that the two or more elevator system organized in the first group are no longer called to the landing.

13. The method of claim 11, wherein the first group is located on first side of the elevator lobby and the second group is located on second side of the elevator lobby.

14. A computer program product embodied on a non-transitory computer readable medium, the computer program product including instructions that, when executed by a processor, cause the processor to perform operations comprising:

detecting an arrival of an elevator car at a landing;

determining a time since a previous elevator car departed the landing;

determining a fullness percentage of the elevator car in response to the number of passengers within the elevator car;

determining an estimated time until a next elevator car arrives at the landing; and determining when the elevator car departs the landing based upon at least one of the fullness percentage of the elevator car, the time since the previous elevator car departed the landing, and the estimated time until the next elevator car arrives at the landing.

15. The computer program product of claim 14, wherein the operations further comprise:

detecting a number of passengers within the elevator car, wherein the fullness percentage of the elevator car is determined in response to the number of passengers within the elevator car.

16. The computer program product of claim 14, wherein the operations further comprise:

commanding the elevator car to the depart the landing when the fullness percentage of the elevator car is greater than a selected fullness percentage.

17. The computer program product of claim 14, wherein the operations further comprise:

commanding the elevator car to the depart the landing when the time since the previous elevator car departed the landing is greater than a selected period of time.

18. The computer program product of claim 14, wherein the operations further comprise:

commanding the elevator car to the depart the landing when the estimated time until the next elevator car arrives at the landing is less than a selected period of time.

19. The computer program product of claim 14, wherein the operations further comprise:

commanding the elevator car to the depart the landing when the fullness percentage of the elevator car is greater than a selected fullness percentage;

commanding the elevator car to the depart the landing when the time since the previous elevator car departed the landing is greater than a selected period of time; and commanding the elevator car to the depart the landing when the estimated time until the next elevator car arrives at the landing is less than a selected period of time.

20. The computer program product of claim 14, wherein the operations further comprise:

obtaining a layout of a physical location of two or more elevator systems within an elevator lobby at the landing, each of the two or more elevator systems including an elevator car; and coordinating arrival of the elevator car of each of the two or more elevator systems at the landing in response to the physical location of the two or more elevator systems within the elevator lobby, wherein the two or more elevator systems are organized in an arrangement within the elevator lobby.

* * * * *